(12) United States Patent
Hinds

(10) Patent No.: US 8,615,978 B2
(45) Date of Patent: Dec. 31, 2013

(54) SUGAR CANE CHOPPER BLADE

(75) Inventor: Michael L. Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 13/292,477

(22) Filed: Nov. 9, 2011

(65) Prior Publication Data

US 2013/0111871 A1  May 9, 2013

(51) Int. Cl.
*A01D 34/00* (2006.01)

(52) U.S. Cl.
USPC ............................................. 56/500; 56/13.9

(58) Field of Classification Search
USPC .................. 56/13.5–14.6, 10.2, 53–60, 500
See application file for complete search history.

(56) References Cited

U.S. PATENT DOCUMENTS

| | | | |
|---|---|---|---|
| 3,141,281 A | 7/1964 | Gaunt et al. | |
| 3,848,399 A * | 11/1974 | Makeham | 56/13.9 |
| 3,995,520 A * | 12/1976 | Spargo | 83/345 |
| 4,035,996 A * | 7/1977 | Fernandez et al. | 56/13.9 |
| 4,065,912 A | 1/1978 | Quick | |
| 4,070,809 A * | 1/1978 | Soulat | 56/13.9 |
| 4,170,098 A * | 10/1979 | Moreno et al. | 56/13.9 |
| 5,031,392 A * | 7/1991 | Baker | 56/13.9 |

* cited by examiner

*Primary Examiner* — Thomas B Will
*Assistant Examiner* — Mai Nguyen

(57) ABSTRACT

Sugar cane stalks are conveyed along a path passing between upper and lower chopper drums equipped with chopper blades extending lengthwise of the drums and located so that blades of one drum intermesh with those of the other so as to cut the cane stalks into billets. The cutting diameter of the blades of the upper chopper drum is greater than that of the blades carried by the lower blade resulting in the peripheral speed of the upper chopper drum being greater than that of the lower chopper drum. The cutting edge of each of the blades is defined at one side by a compound bevel with the blades being disposed on the drums so that they overlap and mesh bevel-to-bevel. The compound bevels are chosen so as to both satisfy the requirement that the blades be self-sharpening and have close to a zero timing angle.

8 Claims, 12 Drawing Sheets

SUGAR CANE CHOPPER BLADE

FIELD OF THE INVENTION

The present invention relates to blades for chopping sugar cane stalks into billets, and more specifically relates to cutting edge bevel arrangements for such blades.

BACKGROUND OF THE INVENTION

The sugar cane stalk chopping systems in most modern cane harvesters include a chopper drum arrangement comprising a pair of counter-rotating drums to which cutting knives are attached. In early versions of such chopper drum arrangements, such as that disclosed in U.S. Pat. No. 3,141,281, the blades did not overlap each other so no blade-on-blade contact occurred. This arrangement did not work well for cutting green leaves when the blades were new and, as the blades wore, they did not completely sever the cane stalks. An improvement was made later wherein the cylindrical path traced by cutting edges of the blades carried by one drum overlapped the cylindrical path traced by the cutting edges of the blades carried by the other drum. U.S. Pat. No. 4,065,912 discloses this improved type of chopping system, but the intent was for the blades carried by the separate drums to have a slight clearance between each other as they intermeshed. This arrangement also had difficulties cutting green leaves.

Over the years, most chopper drum arrangements have been constructed so that beveled surfaces of the cutting edges of the blades are either opposed to each other, i.e., arranged bevel-to-bevel, or are arranged with the beveled surface of one opposed to the backside of the other, and, in both cases, making hard contact with each other. U.S. Pat. No. 3,995,520 discloses the bevel-to-bevel arrangement, which is self-sharpening. This is necessary to cut green leaves and stalks as the beveled cutting edges of the blades wear or get chipped.

However, for a variety of reasons, more and more cane is cut green and there has been an accompanying change to what is called a differential chopper. In a differential chopper, the blades on the top drum are mounted to have larger cutting diameters than the blades of the lower drum. This accelerates the speed of the top portion of the mat of the chopped cane so that it is faster than the speed of the lower portion, resulting in the mat of cane stalks being spread out as it enters the cleaning chamber located adjacent to the chopper drums, thus resulting in improved cleaning. However, this difference in cutting diameters creates the problem of the blades not intermeshing as effectively as they do when the cutting diameters are equal. Specifically, with the different cutting diameters, the blades first contact each other as the blades enter the intermesh zone, and then lose contact with each other as they move over center and exit the intermesh zone. Thus, if the entering or initial angle of contact is small and the upper blade leads the lower blade, the upper blade will undergo self-sharpening, but the lower blade will undergo self-dulling.

What is needed is a blade design for differential chopper drums that have a small angle of contact both when entering and exiting the intermesh zone such that a self-sharpening arrangement for both blades can be had. This will increase blade change intervals thus decreasing operating costs of the machine on which they are used.

SUMMARY OF THE INVENTION

According to the present invention, there is provided a cane stalk chopper drum arrangement including differential chopper drums equipped with novel chopping blades.

An object of the invention is to provide chopping blades used with differential chopper drums and having beveled cutting edges which are self-sharpening. This object is achieved by constructing the beveled cutting edges to have a side defined by compound beveled surfaces, with an initial or first beveled surface making an initial angle with a long side of the chopping blade and with a second beveled surface joining the first and making an angle, which is less than that of the initial angle with a plane extending parallel to the long side, and with the first beveled surface extending toward the short side of the blade a distance considerably shorter than the remaining portion of the compound beveled surface.

This and other objects of the invention will become apparent from a reading of the ensuing description together with the appended drawings.

DESCRIPTION OF THE PREFERRED EMBODIMENT

Figure 1:
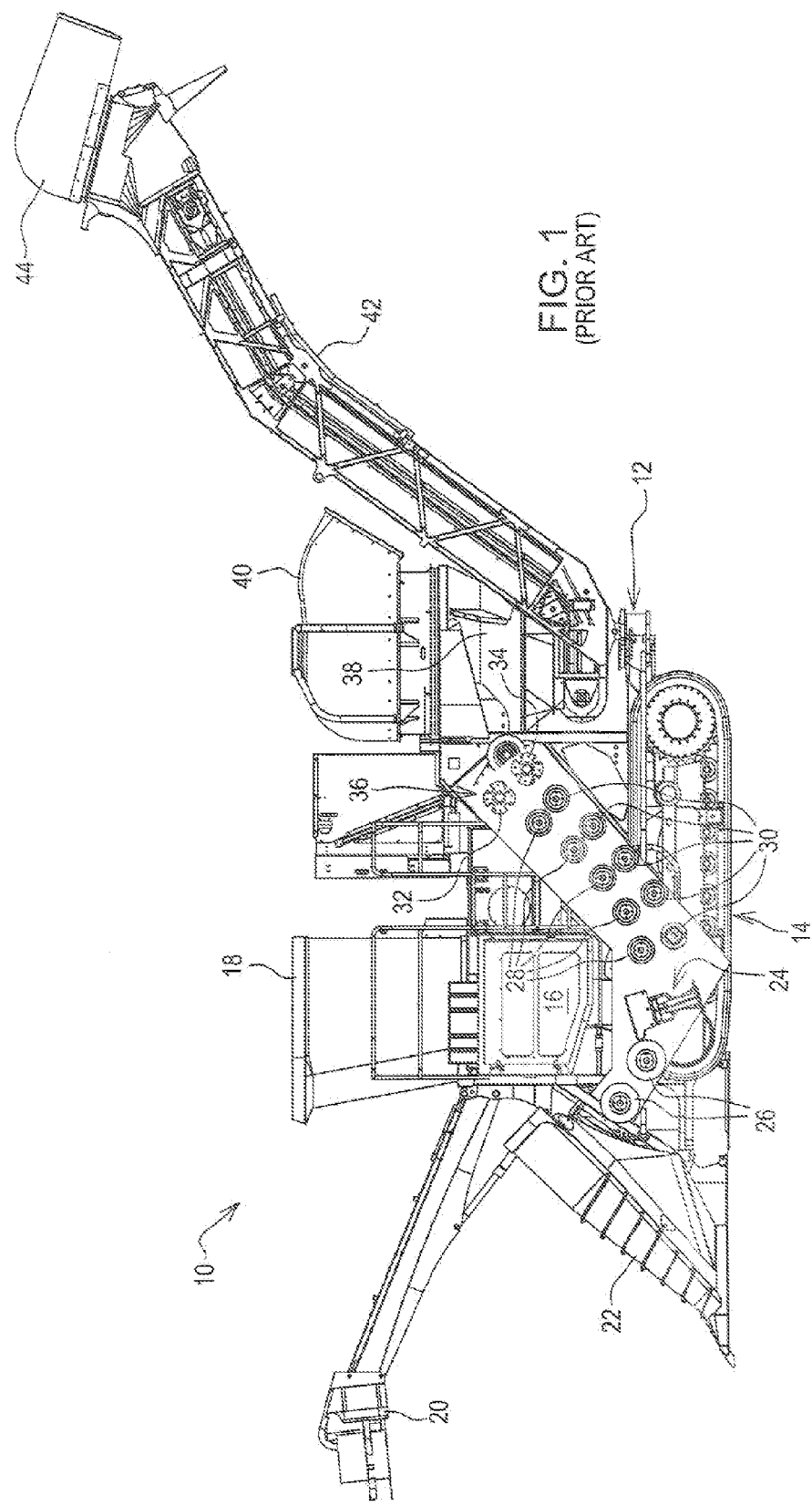
FIG. 1 is a left side view of a typical cane harvester, with parts removed to reveal the cane stalk feed path leading between the chopper drums.

Referring now to FIG. 1, there is shown a typical sugar cane harvester 10 for harvesting rows of standing sugar cane. The harvester 10 includes a main frame 12 supported on right- and left-hand track assemblies, with only the right-hand track assembly 14 being shown. An engine 16 is provided for supplying power for driving the track assemblies and all other driven components of the harvester 10.

An operator's cab 18 is mounted on a forward part of the main frame 12 just behind mountings on the frame 12 for, and in a position of observing the operation of, a cane topper 20 and sets of crop dividers 22. A base cutter assembly 24 is mounted on the main frame 12 at a location below the engine 16 and between the track assemblies for each row of cane stalks and knockdown rollers 26 are provided ahead of the base cutter assembly 24 for orienting the cane stalks for having their cut ends enter an upwardly and rearward oriented feed path defined between pairs of upper and lower feed rolls 28 and 30, respectively, provided for conveying the stalks between upper and lower chopper drums 32 and 34, respectively, of a chopper drum arrangement 36, the drums cooperating to chop the stalks into billets and propel them into a cleaning chamber 38 forming the base of a primary extractor 40. A loading elevator 42 has a forward end located at the bottom of the cleaning zone 38, with the conveyor 42 extending upwardly to the rear where it terminates at a location below a secondary extractor 44.

Figure 2:
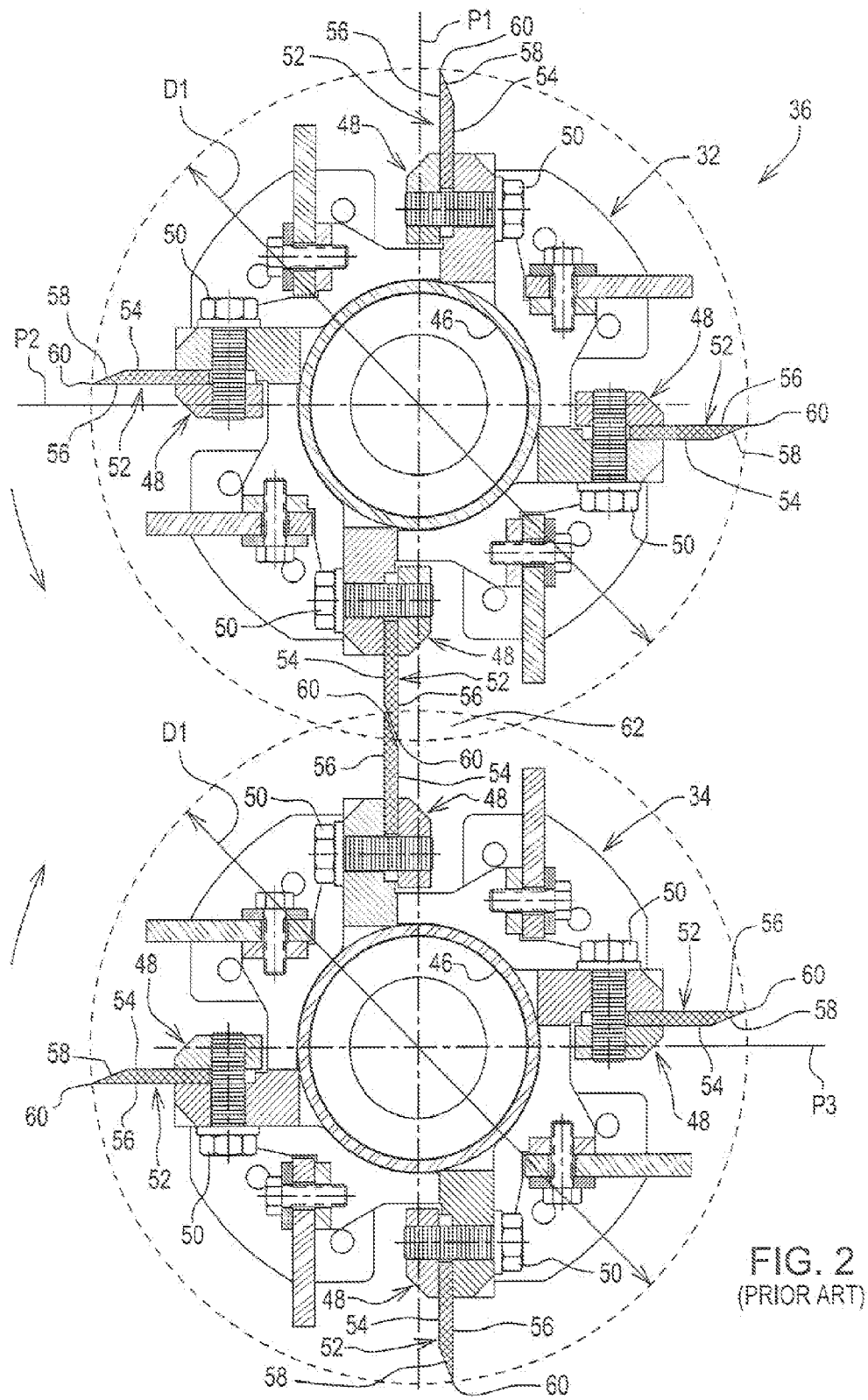
FIG. 2 is a vertical sectional view taken through upper and lower, conventional chopper drums of equal diameter and showing one set of intermeshed blades at a directly opposed, intermeshed position.

Referring now to FIG. 2, it can be seen that the upper and lower chopper drums 32 and 34 are identical. Each of the drums 32 and 34 includes a central support tube 46. Mounted to each of the support tubes 46 are four identical blade mounts 48 which are equally spaced from each other about the circumference of the tubes 46, with each blade mount 48 defining a clamping structure associated with a clamping bolt 50 securing an outwardly projecting chopping blade 52 in place.

With the angular orientations of the upper and lower chopper drums 32 and 34 being as shown in FIG. 2 and with the upper and lower chopper drums 32 and 34 respectively being considered as rotating counterclockwise and clockwise, the top and bottom blade mounts 48 of each of the drums are disposed for clamping the associated chopper blade 52 in a vertical orientations, with the top blade 52 of the upper drum 32 and the bottom blade 52 of the lower drum 34 each being disposed in trailing relationship to a vertical radial plane P1 passing through the centers of the drums. Right- and left-hand blade mounts 48 of each of the chopping drums 32 and 34 clamp the associated blades 52 in horizontal orientations, with right-hand blades 52 of the drums 32 and 34, respectively trailing horizontal planes P2 and P3 respectively passing through the centers of the upper and lower drums 32 and 34, and with left-hand blades 52 of each of the drums 32 and 34 respectively leading the horizontal radial planes P2 and P3. Thus, the blade mounts 48 and blades 52 of the lower chopper drum 34 have dispositions which are a mirror image of those of the upper chopper drum 32.

Each of the blades 52 has parallel short and long sides 54 and 56, respectively, with a beveled outer end of the blade 52 defining a cutting edge 58 joining the short and long sides 54 and 56. The cutting edge 58 makes an included angle of about 20° with the long surface 56 of the blade. It is noted that the chopper drums 32 and 34 each have a cutting diameter D1 traced by an outer tip 60 of the cutting edge 58. The distance between the centers of the drums 32 and 34 is chosen to be less than the cutting diameter D1, with the cutting diameters overlapping to define an intermesh zone 62, noting that the blades 52 are oriented so that the cutting edges 58 mesh bevel-to-bevel.

Figure 3:
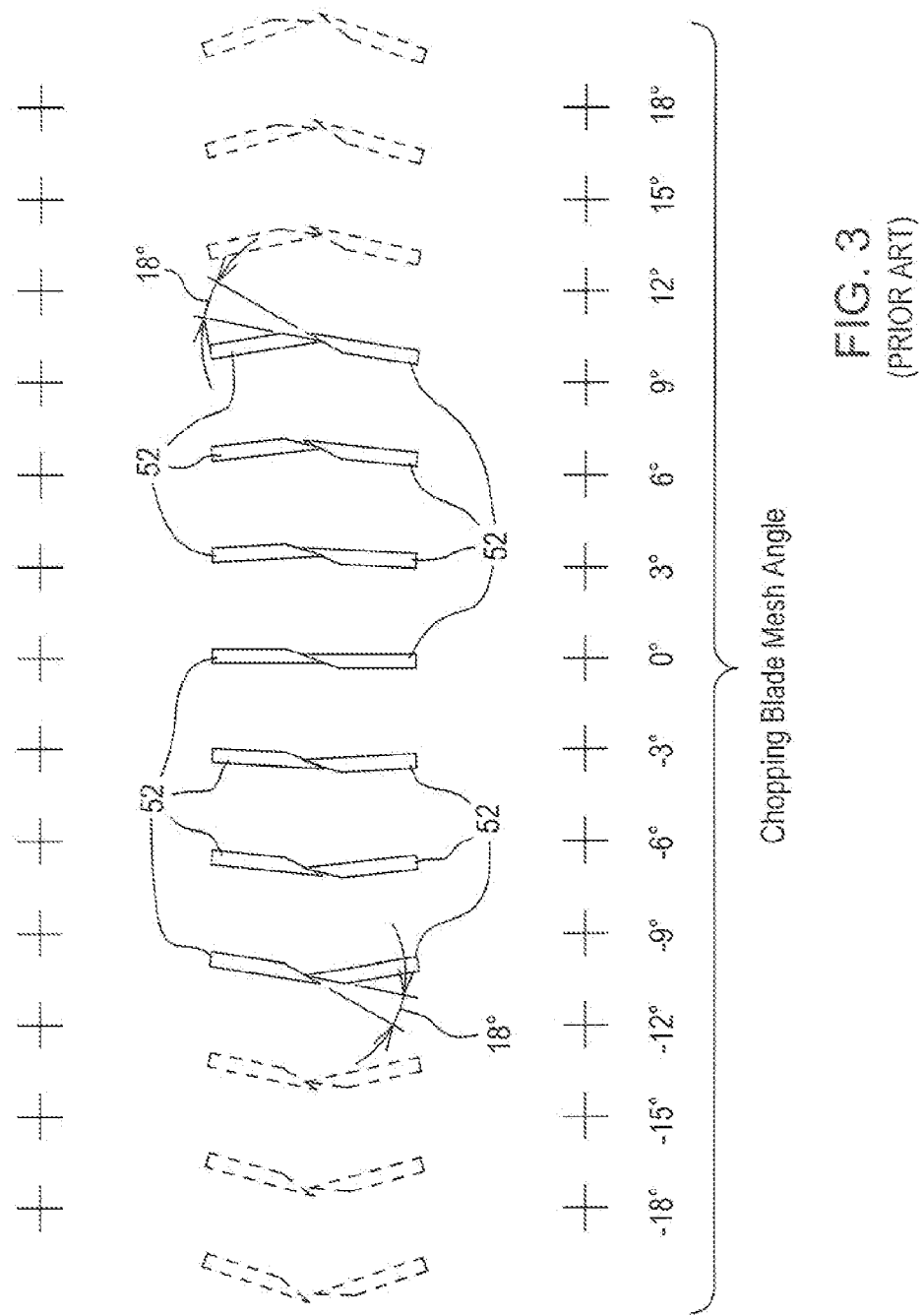
FIG. 3 is a view showing the progression of a pair of the conventional intermeshed blades of FIG. 2 as they progress through the intermesh zone.

Referring now to FIG. 3, there is shown a progression of a set of timed chopping blades 52 respectively of the upper and lower chopper drums 32 and 34 as they pass through the intermesh zone 62, with the blades being shown in dashed lines prior to and after coming into contact with each other, the contacting positions being shown in solid lines. Blade contact between the meshed set of meshed blades 52 occurs on both the entrance and exit sides of the chopper drums 32 and 34, noting that negative angles are on the crop entrance side of zero (0), with zero being the location where the blades are directly opposed to each other. Positive angles are on the crop exit side of the zero position. This arrangement of the blades 52 tends to be self-sharpening as both the entrance angle (angle formed between the cutting edges 58 at point of first contact) and exit angle (angle formed between the cutting edges 58 at point of final contact) are 18°. Furthermore, this arrangement is easy to time as the timing position is the zero degree) (0°) position with the blades substantially parallel to each other (a similar design is illustrated in the aforementioned U.S. Pat. No. 3,995,520).

Figure 4:
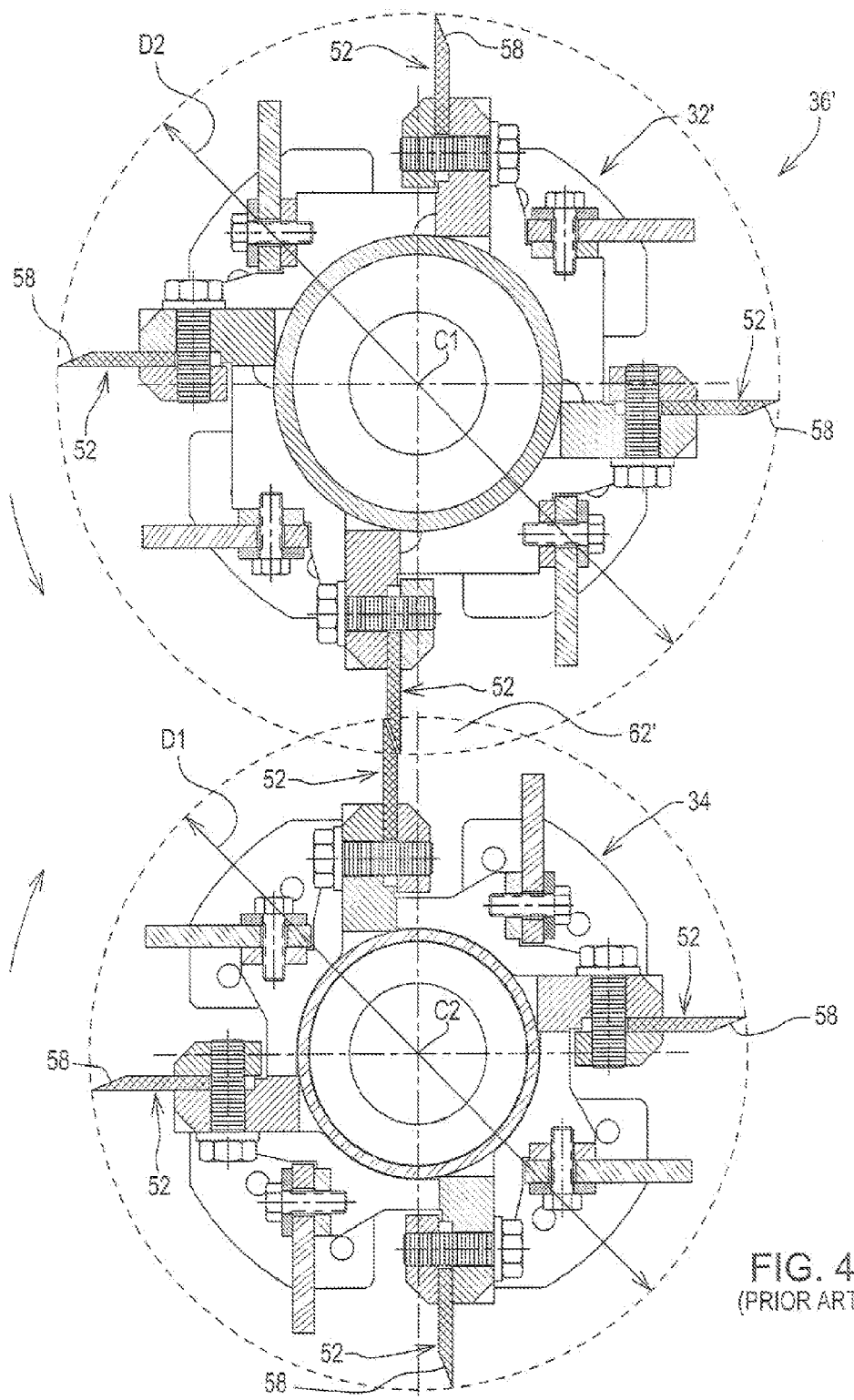
FIG. 4 is a view like FIG. 2 but showing conventional differential drums.

Referring now to FIG. 4, there is shown a prior art chopper blade arrangement 36' similar to the chopper blade arrangement 36 of FIG. 2, but including an upper chopper drum 32' having a central support tube 46' having a larger diameter than the support tube 46 of the lower chopper drum, resulting in a cutting diameter D2 which is larger than the cutting diameter D1 of the lower chopper drum 34. Thus, the chopper drum arrangement 36' is called a differential chopper, this name stemming from the fact that the cutting edges 58 of the blades 52 of the upper chopper drum 32' are further from a center of rotation C1 of the upper chopper drum 32' than the cutting edges 58 of the blades 52 are from a center C2 of the lower chopper drum 34. Thus, the cutting edges 58 of the upper chopper drum move faster than those of the lower chopper drum which results in the top portion of the mat of chopped cane conveyed to the chopper assembly 36' moving faster than the lower portion of the mat. This has the benefit of the mat of cane being spread out as it enters the cleaning chamber 38 of the primary extractor 40 and, consequently, in improved cleaning. It is also noted that the distance between the centers of rotation C1 and C2 is approximately equal to the cutting diameter of the lower chopper drum 34, resulting in an overlap of the cutting diameters D1 and D2 to define an intermesh zone 62' where timed sets of the blades 52 respectively of the upper and lower chopper drums 32' and 34 intermesh. As illustrated, the relative dimensions of the chopper drums 32' and 34 results in the cutting diameter D2 of the blades 52 of the upper chopper drum 32' being approximately 10% larger than the cutting diameter D1 of the blades 52 of the lower chopper drum 34.

Figure 5:
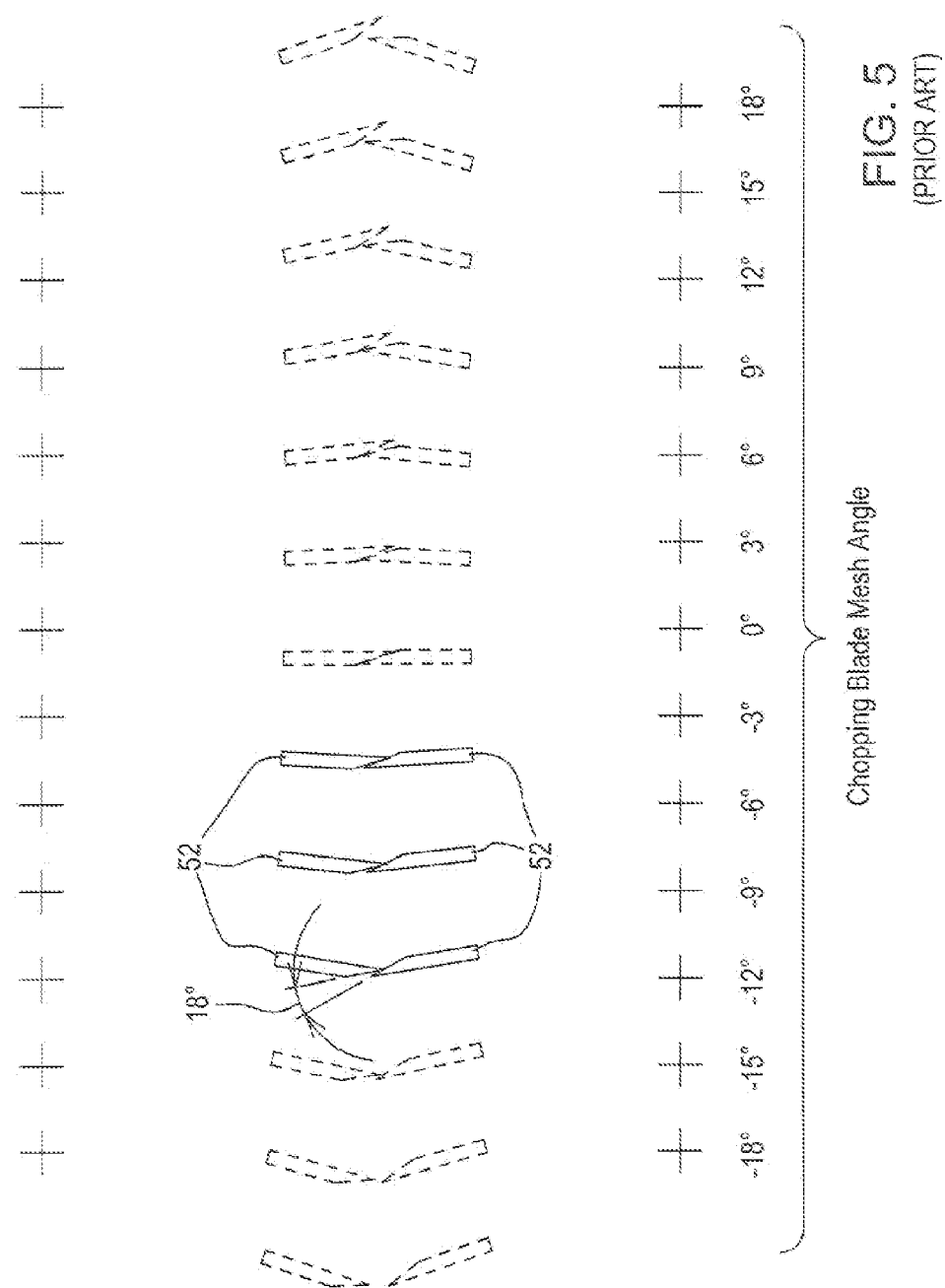
FIG. 5 is a view like FIG. 3 but showing a pair of the conventional intermeshed blades of the differential drums of FIG. 4 as they progress through the intermesh zone.
Figure 6:
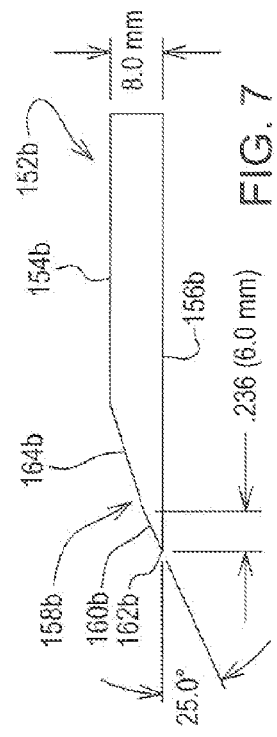
FIGS. 6-11 are side views of chopper blade embodiments having cutting edges constructed with compound bevel angles in accordance with the present invention, with each blade having a different first cutting edge bevel angle at the end of the blade.
Figure 7:
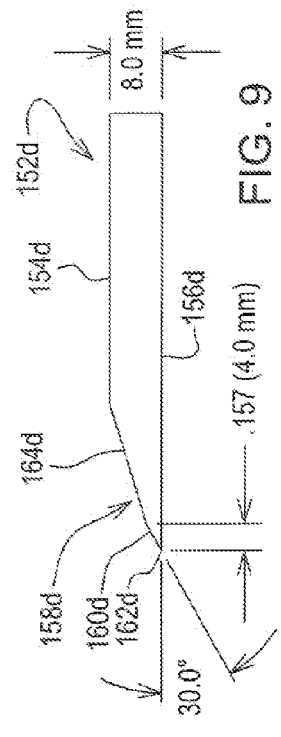
Figure 8:
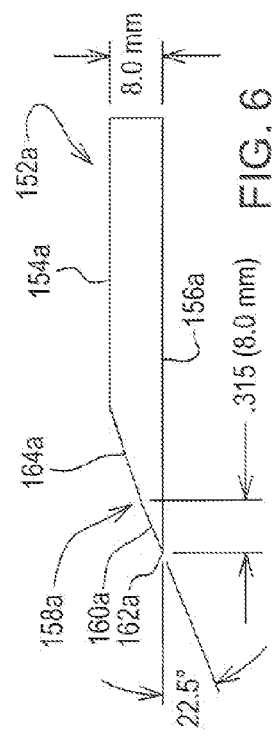
Figure 9:
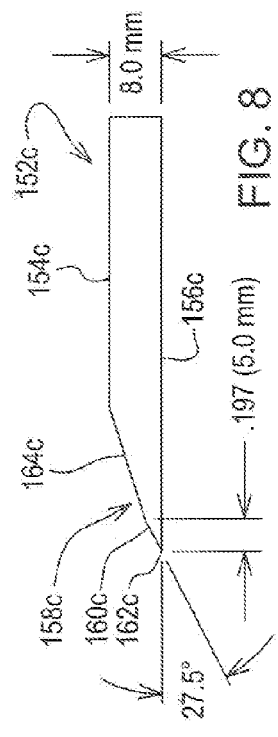
Figure 10:
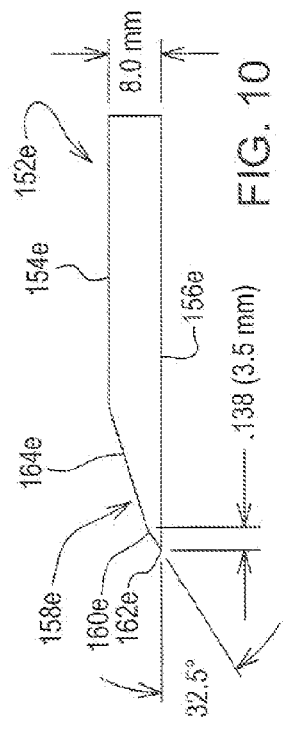
Figure 11:
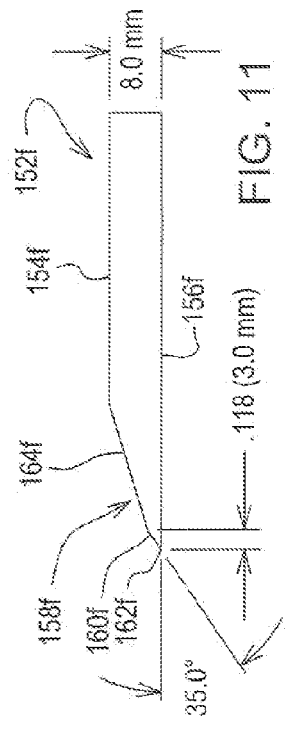

Referring to FIG. 5 there is shown a progression of a timed set of blades 52 respectively of the upper and lower chopper drums 32' and 34 as they pass through the intermesh zone 62'. Blade contact between the meshed set of meshed blades 52 occurs only on the entrance side of the chopper drums 32' and 34, noting that negative angles are on the crop entrance side of zero (0), with zero being the location where the blades are directly opposed to each other. Positive angles are on the crop exit side of the zero position. An entrance angle of 18° (the angle formed between the cutting edges 58 at the initial point of contact between the cutting edges) is the same as that of the self-sharpening arrangement shown in FIG. 3 and tends to keep the blades 52 of the top chopper drum 32' sharp. The chopper blades 52 of the lower chopper drum 34 do not make contact with the chopper blades 52 of the upper chopper drum 32' and tend to dull quickly as compared to the blades 52 of the upper chopper drum 32'. The blades 52 of the top chopper drum 32' are normally re-used when the blades 52 of the lower chopper drum 34 become dull. It is also noted that timing of the meshed blades of the upper and lower chopper drums 32' and 34, respectively, is somewhat difficult since the timing position is close to the minus three degree (−3°) position and the meshed set of blades 52 are not disposed parallel to each other.

Respectively shown in FIGS. 6-11 are chopping blades 152a-152f, having respective cutting edges 158a-158f formed in accordance with the present invention to have a compound angled bevel surface. Specifically, with reference to FIG. 6, it can be seen that the chopper blade 152a includes short and long parallel sides 154a and 154b, respectively, with an end of the chopper blade 152a being beveled to form a cutting edge 158a extending between the short and long sides 154a and 156a. The cutting edge 158a is defined by an initial bevel surface 160a that makes an angle of 22.5° with the long surface 156a. The initial bevel surface 160a extends a short distance away from a tip 162a of the cutting edge 158a where it joins a second bevel surface 164a that extends to the short side 154a of the blade 152a and makes an angle of approximately 20° with a line extending parallel to the blade sides 154a and 156a. The second bevel surface 164a extends between the first bevel surface 160a and the blade surface 154a through a distance which is several times greater than a second distance through which the first bevel surface 160a extends from the cutting edge tip 162a.

The chopper blades 152b-152f are similarly respectively provided with compound bevel surfaces, with the first bevel surfaces 160b-160f respectively making initial angles of 25°, 27.5°, 30°, 32.5° and 35° with the blade long sides 154b-154f, with it being noted that, as the initial angles increase, the distances that the first bevel surfaces 160b-160f respectively extend from cutting edge tips 162b-162f decreases.

Figure 12:
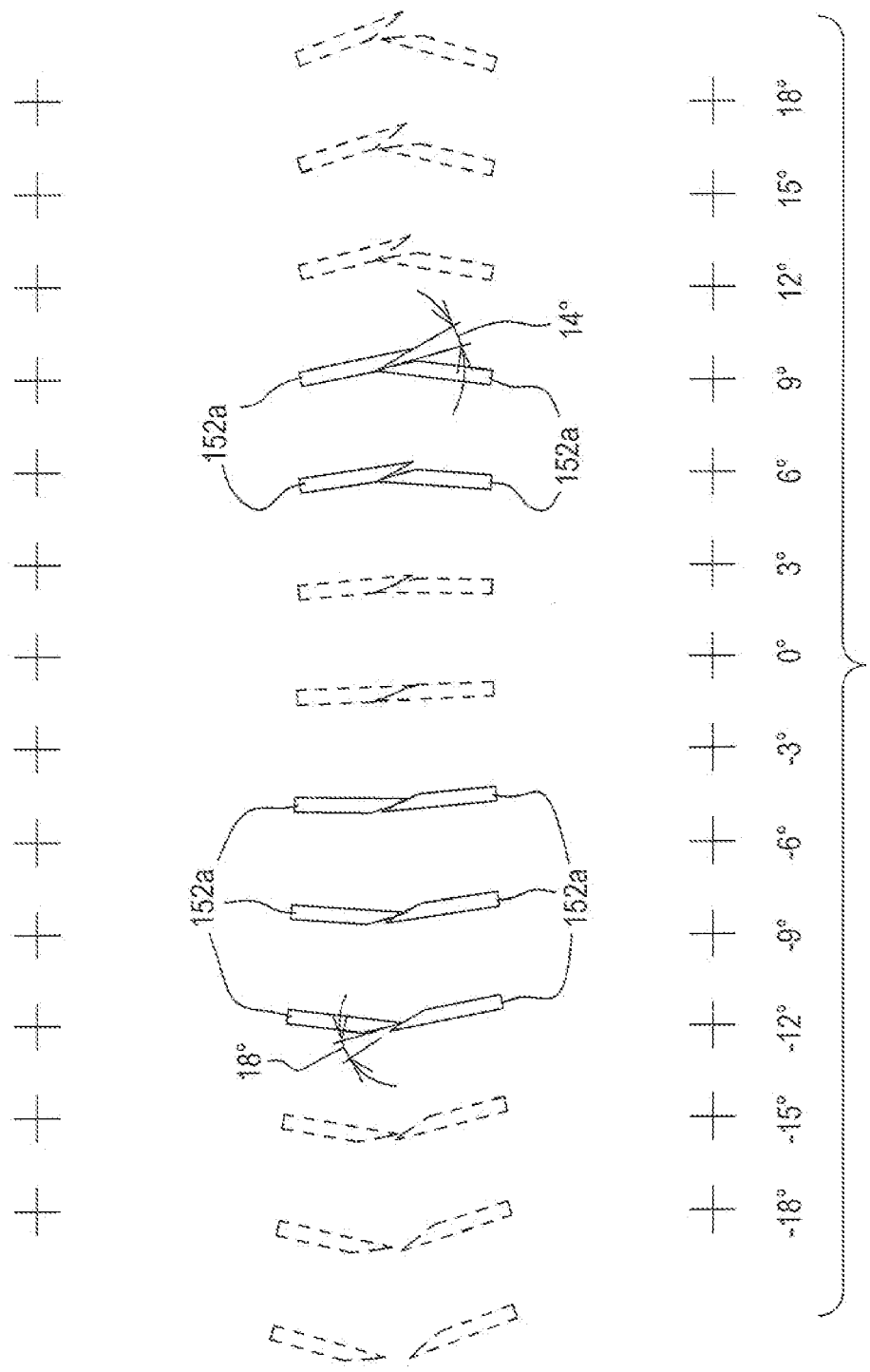
FIGS. 12-17 are views like that of FIG. 3, but respectively show the progression of intermeshed blades having the beveled cutting edges of FIGS. 6-11 as the respective sets of blades progress through the intermesh zone.

Referring now to FIGS. 12-17, there is respectively shown the intermesh pattern that would result from the operation of the chopper blades 152a-152f when applied to the upper and lower chopper drums 32' and 34 shown in FIG. 4 in lieu of the blades 52 having but a single bevel surface. Thus, as can be seen in FIG. 12, the first contact between the intermeshing blades 152a having initial bevel angles of 22.5° occurs approximately at the −12° position within the intermesh zone 62', with the entrance angle being approximately 18° and the exit angle being approximately 14° and occurring approximately at the 9° position within the intermesh zone. These entrance and exit angles results in the blades 152a being self-sharpening. A non-contact timing position of the blades 152a where the blades are disposed parallel to each other is located just to the negative side of the zero angle position, and therefore is relatively easy to find.

Figure 13:
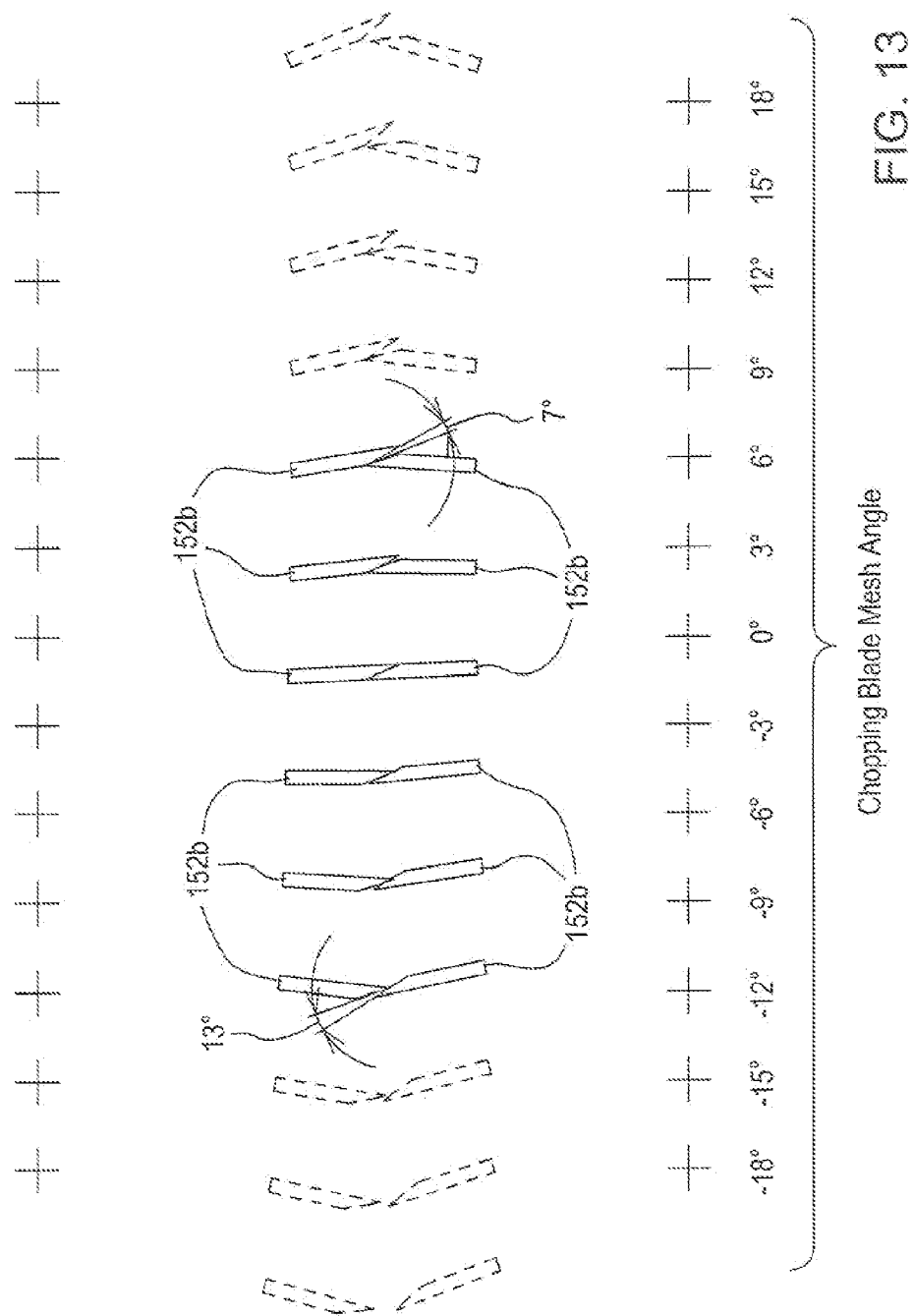

Referring to FIG. 13, it can be seen that the first contact between the intermeshing blades 152b having initial bevel angles of 25° occurs at approximately −12°, with the entrance angle being approximately 13° and with the exit angle being approximately 7° and occurring at approximately the 6° position of the blades within the intermesh zone 62'. These relatively shallow entrance and exit angles result in the blades 152a being self-sharpening. A contact timing position of the blades 152b when parallel to each other occurs approximately at the zero angle (0°) position of the blades, and therefore is easy to find.

Figure 14:
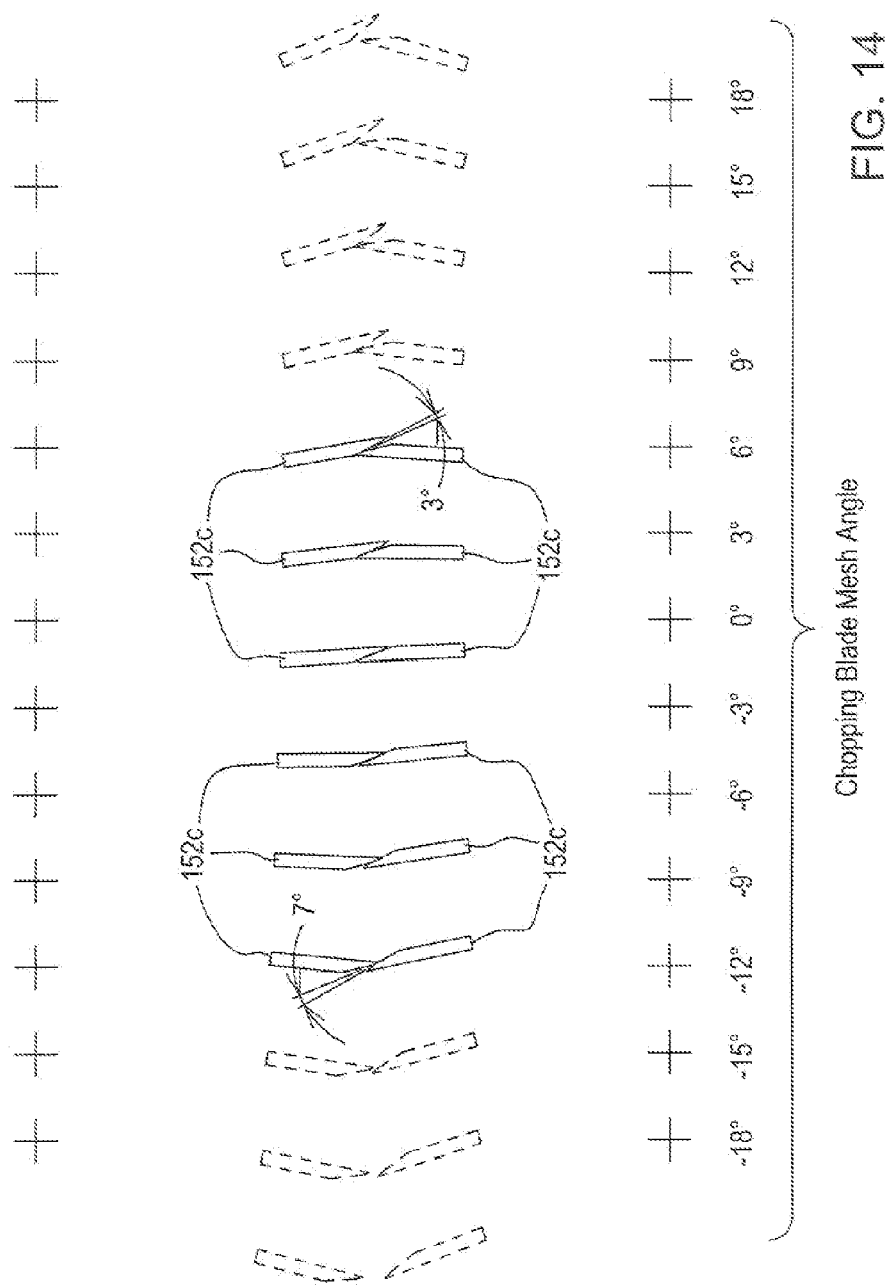

Referring to FIG. 14, it can be seen that the first contact between the intermeshing blades 152c having initial bevel angles of 27.5° occurs within the intermesh zone 62' at a mesh angle of approximately −12°, with the entrance angle being 7° and with the final contact between the blades occurring within the intermesh zone 62' at approximately 6°, the exit angle being 3°. These entrance and exit angles result in the blades 152c being self-sharpening. The blades 152 respectively of the upper and lower chopper drums 32' and 34 are easily timed as the timing position is the zero angle (0°) position.

Figure 15:
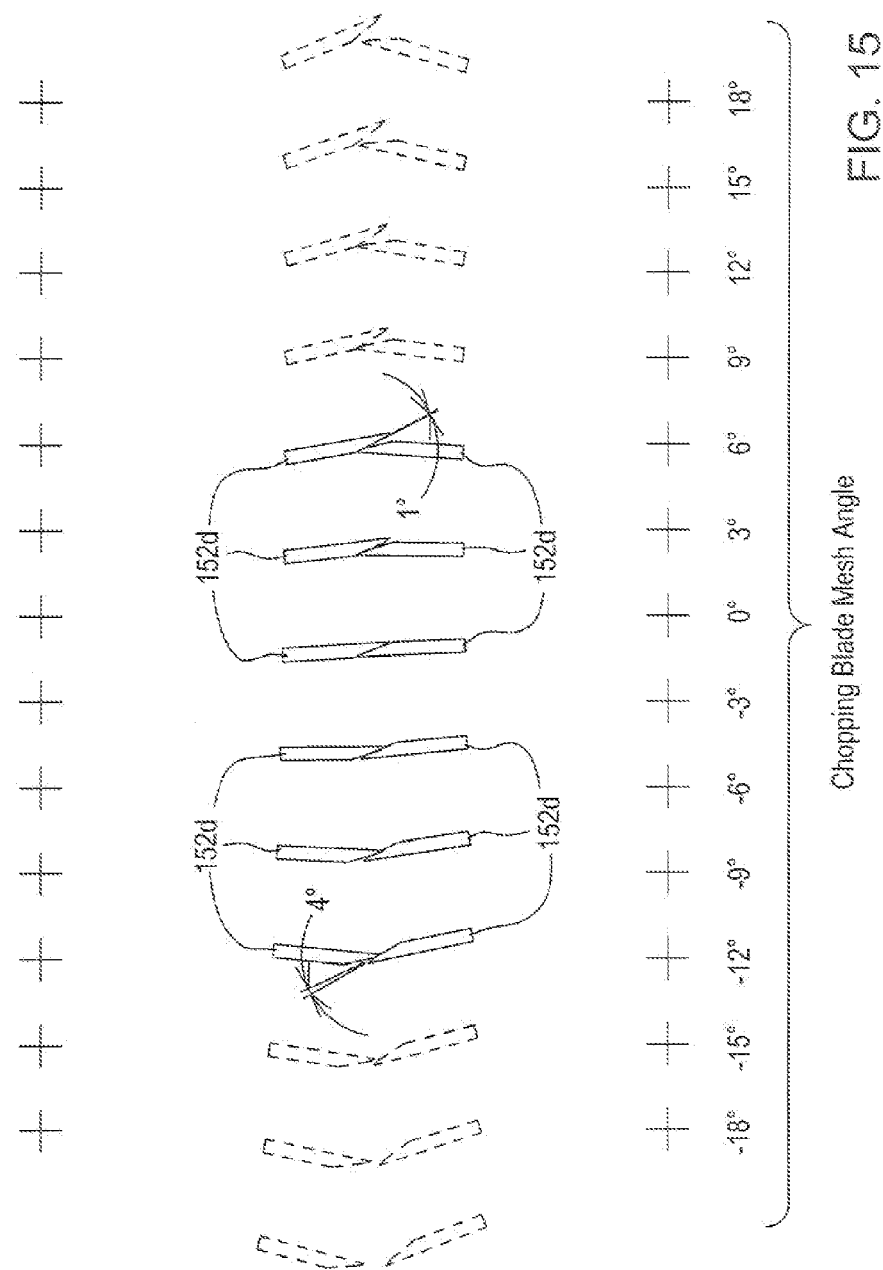

Referring to FIG. 15, it can be seen that first contact between the cutting edges 158d of the intermeshed blades 152d, having initial bevel angles of 30°, occurs within the intermesh zone 62' at approximately the −12° location, with the entrance angle being approximately 4°. Final contact between the cutting edges 158d of the blades 152d occurs at an angle of approximately 6° within the intermesh zone 62', with the exit angle being approximately 1°. The timing position is at the zero angle position of the blades 152d.

Figure 16:
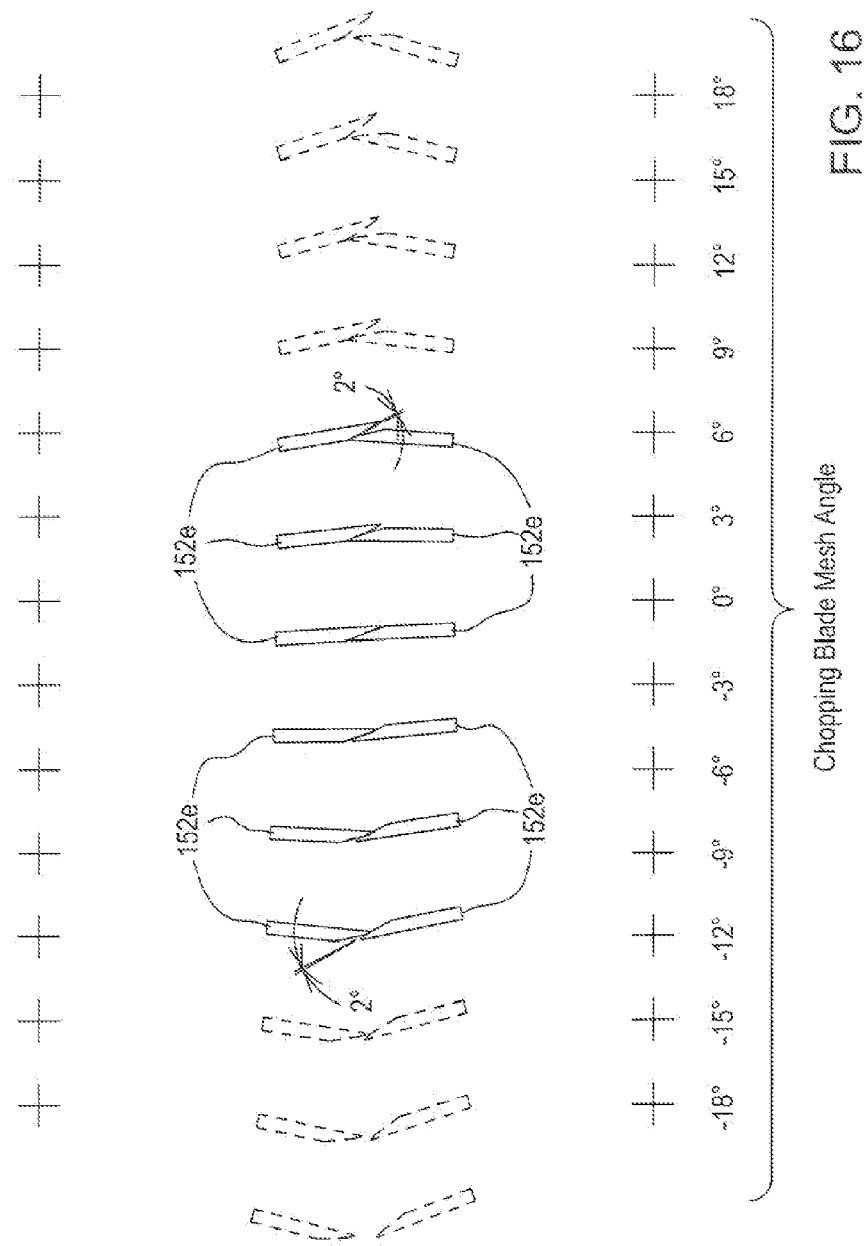

Referring to FIG. 16, it can be seen that first contact between the cutting edges 158e of the intermeshed blades 152e, which have initial bevel angles of 32.5° occurs within the intermesh zone 62' at approximately the −12° location, with the entrance angle being approximately 2°. Final contact between the cutting edges 158e of the blades 152e occurs at an angle of approximately 6° within the intermesh zone 62', with the exit angle also being approximately 2°. The timing position is at the zero angle location of the blades 152e.

Figure 17:
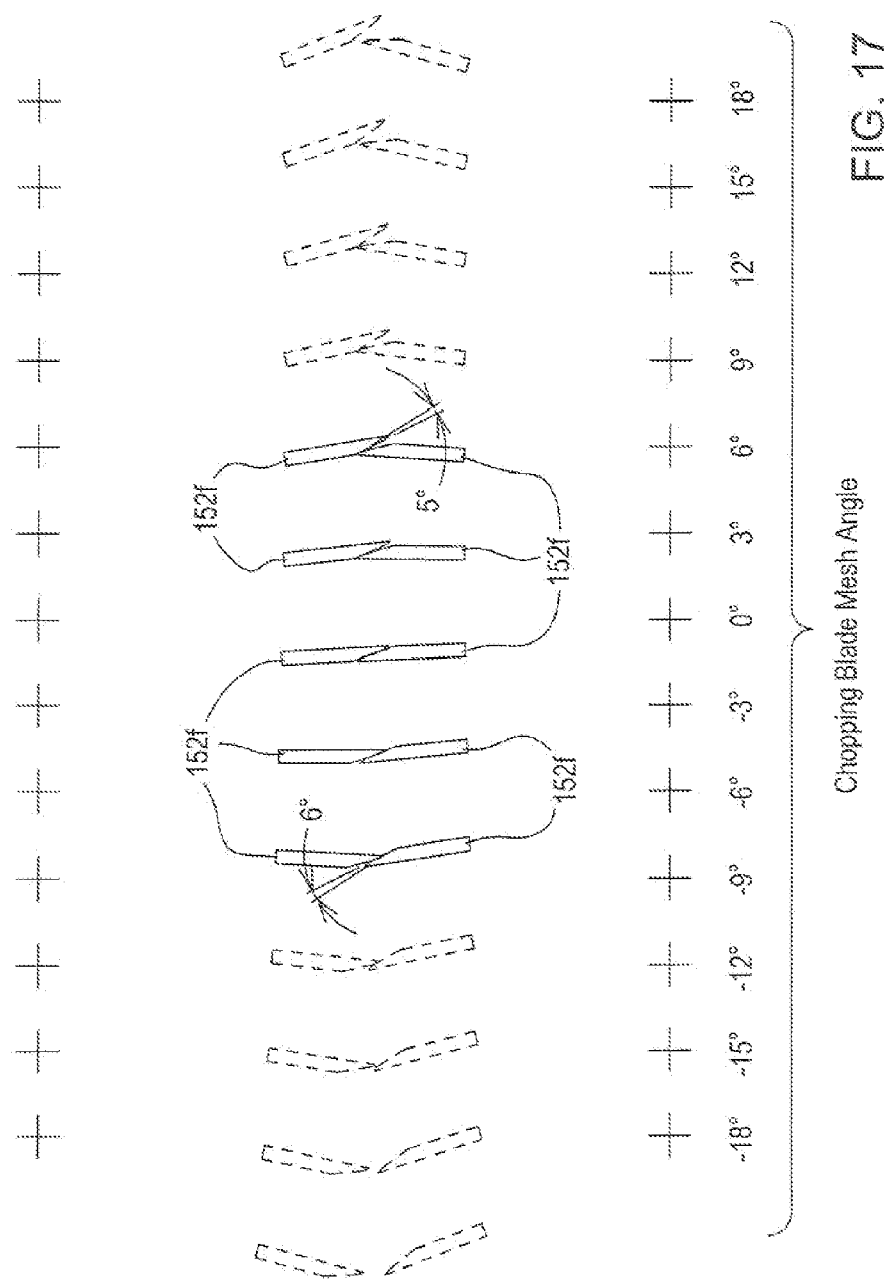

Referring to FIG. 17, it can be seen that first contact between the cutting edges 158f of the blades 152f, which have initial bevel angles of 35°, occurs within the intermesh zone 62' at approximately the −9° position, with the entrance angle between the cutting edges 158f being about 6°. Final contact between the cutting edges 158f occurs at an angle of about 6° within the intermesh zone 62', with the exit angle between the cutting edges 158f being approximately 5°. The timing position is zero degrees.

Thus, it will be appreciated that the disadvantages attendant with the conventional chopper drum arrangement 36 having chopper drums with blades having equal cutting diameters, as illustrated in FIGS. 2 and 3, and with the conventional differential chopper drum arrangement 36', as illustrated in FIGS. 4 and 5, can be avoided by a differential chopper drum arrangement like 36', but using blades having cutting edges including a side defined by compound beveled surfaces formed so that as a timed set of the blades rotate through the intermesh zone the entrance and exit angles will be equal to or less than 18° with the timing position being at or close to the zero angle position, whereby the meshed blades are self-sharpening. Further, it will be appreciated that this operational relationship between the cutting edges of the meshed blades can be achieved if the compound bevel angle includes an initial bevel surface which makes an angle with the long side of the chopping blade greater than 20° or less than or equal to 35° and extends from the tip of the cutting edge to the second bevel surface through a distance which varies from about one third to one eighth of the distance between the cutting edge tip and the short side of the blade, noting that, as the initial angle increases, the distance through which the initial bevel surface extends decreases.

Having described the preferred embodiment, it will become apparent that various modifications can be made without departing from the scope of the invention as defined in the accompanying claims.

The invention claimed is:

1. A sugar cane stalk chopper drum arrangement, comprising:
    a first chopper drum mounted for rotation about a first axis of rotation;
    a second chopper drum mounted for rotation about a second axis of rotation extending parallel to said first axis of rotation;
    said first and second chopper drums being respectively equipped with at least first and second identical chopping blades, said blades respectively having first and second beveled outer ends defining first and second cutting edges extending between parallel long and short sides of the associated one of said at least first and second chopping blades, with the first and second cutting edges respectively having first and second outer tips spaced from, and extending parallel to, an associated one of the first and second axes of rotation;
    said first outer tip tracing a first cylindrical cutting path having a first diameter when said first chopper drum rotates about said first axis;
    said second outer tip tracing a second cylindrical cutting path having a second diameter which is less than said first diameter, with said first and second cutting paths overlapping each other and defining an intermesh zone;
    said first and second beveled outer ends each including an initial bevel surface joined to a second bevel surface, with said initial bevel surface joined to, and making an initial angle with the long side of the associated one of said at least first and second chopper blades and cooperating with the long side to define either the first outer tip of the first blade or the second outer tip of the second blade;

said second bevel surface being joined to the short side of the associated one of the first and second chopping blades;

the initial angle that each of said initial bevel surfaces make with the long side of the associated one of the first and second chopping blades being greater than an angle formed between each of said second bevel surfaces and a plane extending parallel to said long side; and the at least first chopping blade of the first chopper drum and the at least second chopping blade of the second chopper drum are so mounted on the respective chopper drums that the cutting edges come into bevel-to-bevel contact on opposite sides of a timing position when passing through the intermesh zone.

2. The chopper drum arrangement, as defined in claim 1, wherein said initial angle is in the range from about 22.5° to 35°.

3. The chopper drum arrangement, as defined in claim 1, wherein the first and second chopper drums are so disposed relative to each other and the at least first and second cutting blades are so located relative to each other that, entrance and exit angles respectively where the beveled surfaces first and finally come into contact with each other in the intermesh zone are each 18° or less, whereby the at least first and second cutting blades are self-sharpening.

4. The chopper drum arrangement, as defined in claim 2, with the initial bevel surface of the first and second cutting edges extending toward the associated short side by a distance between one-third and one-eighth of the total distance between the first and second tips and the associated long sides of the first and second cutting blades, with these distances of the blades increasing as the respective initial angles decrease.

5. In a differential chopper drum arrangement including upper and lower chopper drums respectively mounted for rotation about upper and lower axes of rotation, with the upper and lower chopper drums each being equipped with at least one chopping blade having parallel long and short sides joined by a beveled surface at an outer end of the blade extending inwardly from an outer tip of the blade, as considered relative to the associated axis of rotation, thereby defining a cutting edge, with the tip tracing out a cutting diameter during rotation of the associated chopper drum, with the upper chopper drum having a cutting diameter larger than, and overlapping that of said lower chopper drum, thereby defining an intermesh zone through which the respective cutting edges of the at least one chopping blade of each of said upper and lower chopper drums pass in cooperating fashion during chopping operation, and with said blades being mounted for having their respective cutting edges come into bevel-to-bevel engagement when passing through said intermesh zone, the improvement comprising: said beveled surface of the at least one chopping blade of each of said upper and lower chopper drums being formed of an initial bevel surface which extends inwardly from said tip and is joined to a second bevel surface that extends to said short side; and the initial bevel surface of each blade being angled from the associated long side by an initial angle which results in an entrance and exit angles of contact between the beveled surfaces of the at least one chopping blade of each of the upper and lower chopper drums occurring at opposite sides of an intermediate timing angle within the intermesh zone wherein the at least one blades are directly opposed to each other, with the entrance and exit angles being such that the each of the at least one chopping blades of the upper and lower chopper drums are self-sharpening.

6. The differential chopper drum arrangement, as defined in claim 5, wherein said entrance and exit angles are no greater than about 18° and said timing angle is approximately zero degrees.

7. The differential chopper drum arrangement, as defined in claim 5, wherein said initial angle of said beveled surface of each of said at least one chopping blade of the upper and lower chopper drums is in a range from an angle greater than 20° to an angle of 35°, with the second angle of said beveled surface of each of said at least one chopping blade of each of said upper and lower chopper drums being less than said initial angle.

8. The differential chopper drum arrangement, as defined in claim 6, wherein said initial angle of said beveled surface of each of said at least one chopping blade of the upper and lower chopper drums is in a range from an angle greater than 20° to an angle of 35°, with the second angle of said beveled surface of each of said at least one chopping blade of each of said upper and lower chopper drums being less than said initial angle.

* * * * *